(12) United States Patent
Burgess et al.

(10) Patent No.: US 12,430,574 B2
(45) Date of Patent: Sep. 30, 2025

(54) APPARATUS AND METHODS FOR PROACTIVE COMMUNICATION

(71) Applicant: Bank of America Corporation, Charlotte, NC (US)

(72) Inventors: Patrick Burgess, Stockholm (SE); Denise M. Marcus, Mooresville, NC (US); Trish Gillis, Chicago, IL (US); Taylor Farris, Hoboken, NJ (US); Napangsiri Wanpen, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 1093 days.

(21) Appl. No.: 17/392,408

(22) Filed: Aug. 3, 2021

(65) Prior Publication Data

US 2023/0040231 A1 Feb. 9, 2023

(51) Int. Cl.
*G06N 5/04* (2023.01)
*G06N 20/00* (2019.01)
*G06Q 40/02* (2023.01)
*G09B 19/00* (2006.01)
*H04L 9/40* (2022.01)
*G06Q 10/10* (2023.01)

(52) U.S. Cl.
CPC .............. *G06N 5/04* (2013.01); *G06N 20/00* (2019.01); *G06Q 40/02* (2013.01); *G09B 19/0053* (2013.01); *H04L 63/0861* (2013.01); *G06Q 10/10* (2013.01)

(58) Field of Classification Search
CPC .......... G06N 20/00; G06N 5/04; G06Q 40/02; G06Q 10/10; G09B 19/0053; H04L 63/0861
See application file for complete search history.

(56) References Cited

U.S. PATENT DOCUMENTS

| | | | |
|---|---|---|---|
| 9,047,608 B1 * | 6/2015 | Einav | G06Q 30/018 |
| 9,514,294 B1 * | 12/2016 | Hepburn | H04L 63/0281 |
| 9,537,959 B1 * | 1/2017 | Mateer | H04M 7/0024 |
| 9,654,477 B1 * | 5/2017 | Kotamraju | H04L 63/105 |
| 9,800,596 B1 * | 10/2017 | Chiles | H04L 63/1416 |
| 10,439,898 B2 * | 10/2019 | Ranjekar | H04L 41/5009 |
| 11,392,664 B1 * | 7/2022 | Merritt | G06F 16/9535 |
| 11,797,286 B2 * | 10/2023 | Punja | G06F 8/62 |
| 2015/0121491 A1 * | 4/2015 | Xia | H04L 63/083 726/6 |
| 2016/0321641 A1 * | 11/2016 | Cady | G06Q 20/40 |
| 2017/0228787 A1 * | 8/2017 | Oyaga | G06Q 30/0264 |

(Continued)

*Primary Examiner* — April Y Blair
(74) *Attorney, Agent, or Firm* — Weiss & Arons LLP

(57) ABSTRACT

Apparatus and methods for proactively and preemptively communicating with a user interacting with a software application are provided. The apparatus and methods may include an artificial intelligence/machine learning communication engine monitoring and tracking a user's interactions. The apparatus and methods may include the communication engine determining if the user requires further training, if the interaction is fraudulent, and pre-empting requests for information the user may commence. The apparatus and methods may include the communication engine creating and displaying training materials for the user to complete, revoking access if fraud is present, and proactively providing information before the user requests the information.

16 Claims, 8 Drawing Sheets

(56) References Cited

U.S. PATENT DOCUMENTS

| | | | |
|---|---|---|---|
| 2019/0278627 A1* | 9/2019 | Kapinos | G06N 5/04 |
| 2020/0226418 A1* | 7/2020 | Dorai-Raj | G06F 16/313 |
| 2021/0042581 A1* | 2/2021 | Kursun | G06F 21/552 |
| 2021/0097191 A1* | 4/2021 | Howell | G06F 11/327 |
| 2021/0150489 A1* | 5/2021 | Haramati | G06F 16/252 |
| 2022/0020085 A1* | 1/2022 | Degrazia | G06F 16/9535 |
| 2022/0083995 A1* | 3/2022 | Flowers | G06Q 20/3676 |

* cited by examiner

APPARATUS AND METHODS FOR PROACTIVE COMMUNICATION

FIELD OF TECHNOLOGY

Aspects of the disclosure relate to providing apparatus and methods for proactively communicating with a user interacting with a software application.

BACKGROUND OF THE DISCLOSURE

Consumers, customers and other users interact and use various software applications billions of times per day. Many of these interactions take place online/in the cloud through a computer or a mobile device such as a smartphone. In addition, many interactions may be interactive, for example, where an employee, customer, or other users have a conversation with a chatbot that responds to various inputs. Other software applications may interact with users in other ways.

Many of these interactions may be limited by the range and usefulness of a particular chatbot. Even 'smart' chatbots may be unable to seamlessly deliver certain material, instructions, or replies to a user. In particular, current chatbots are unable to deliver bespoke training materials to users as they are interacting with the chatbot/application. In addition, chatbots may be unable to detect malicious activities as they occur.

Proactively communicating with a user of a software application may solve these limitations of current chatbots and other interactive applications. Predicting when a user requires help and training, and determining when malicious activity is occurring may be useful and important upgrades to existing software applications.

Therefore, it would be desirable for apparatus and methods for proactively communicating with a user interacting with a software application.

SUMMARY OF THE DISCLOSURE

It is an object of this disclosure to provide apparatus and for proactive communication with a user interacting with a software application.

An apparatus for proactively and preemptively communicating with a user during a user's interactions with a software application is provided. The apparatus may utilize artificial intelligence/machine learning ("AI/ML") to determine if a user's interaction with an application is fraudulent, or if a user requires help/training while using the application. The apparatus may include a server. The server may be centralized or distributed across multiple computers.

The server may include a communication link. The server may utilize the communication link to communicate, over a network, with the application the user is interacting with.

The server may include one or more processors and non-transitory memory. The non-transitory memory may store an operating system as well as an AI/ML communication engine. The non-transitory memory may also store other applications as well as data, as necessary. The applications, including the operating system and the AI/ML communication engine may run on the processor(s).

In an embodiment, the AI/ML communication engine may be a part of (i.e., a module or plugin) the application the user is interacting with. In another embodiment, the AI/ML communication engine may be separate and distinct from the application the user is interacting with, e.g., the communication engine may be a third-party application.

The AI/ML communication engine may monitor and track what the user is doing with the software application. It may monitor and track the user's inputs, including queries and other interactions with the application. By monitoring and tracking the user's communications with the application, the AI/ML communication engine may determine if the user's interaction(s) is fraudulent. The AI/ML communication engine may also decide if the user needs help or training on how to use the application.

When the communication engine determines the interaction(s) is fraudulent it may revoke access to the application. In addition, it may generate an incident report regarding the fraudulent use of the application.

When the communication engine determines that the user requires further help or training with using the application, it may suggest and show one or more training modules for the user to complete.

The AI/ML communication engine may utilize any appropriate machine learning algorithm. The engine may learn from the user's past interactions with the application. For example, if the user always requests an account balance statement at 9:00 am on Mondays, the engine may be proactive and pre-empt the user's request and provide that information before the request. In an embodiment, these past interactions may be stored in a database. The database may be within the server or remote from the server. The data may be encrypted.

The engine may learn from historical interactions of other users with the application. Learning from other users may provide a broader base of data for the AI/ML engine to refine its operations, as well as provide better results. The engine may learn from various training data. The training data may be real-world data or engineered data.

In an embodiment, the AI/ML communication engine may utilize pre-determined time limits when analyzing the user's interaction(s). For example, if a particular action should be performed by a user within an average of 20 seconds, a pre-determined time limit for that action might be 20 seconds, or 40 seconds, or some other pre-determined time. If the communication engine detects that the user has exceeded the pre-determined time, it may analyze and determine that the user requires further training on that particular action. If the user requires further training, the communication engine may suggest and display a training module for the user.

In an embodiment, the communication engine may point the user to training materials by providing a selectable link, e.g., a hyperlink, to an internal or external website containing the appropriate training materials.

In an embodiment, the pre-determined time limits may be determined by averaging the length of time for all previous users performing that action. This may provide the communication engine with an average length of time for an average user of the application. In an embodiment, this average length of time may be constantly updated by the communication engine as it receives more data points. In an embodiment, the communication engine is provided with an initial average length of time.

In an embodiment the training module or training materials suggested and/or displayed by the communication engine may be dynamic. The training module or training materials may change, and may be changed (or created) by the communication engine. These training materials and modules may be unique, in some or many respects, to a particular user. Training materials/modules may be interactive and responsive to the user as the user works her way through the training materials/modules.

In an embodiment, the communication engine may create the training module/materials using an AI/ML algorithm from existing examples.

In an embodiment, the training materials/modules may be pre-set and unable to be changed by the communication engine.

In an embodiment, the AI/ML communication engine may proactively deliver some amount of information/data to the user. The communication engine may predict/preempt the user's request by studying the user's 'habits' and learning from prior requests. For example, if a user generally requests an update on the stock market at 4:30 p.m., the communication engine may prepare a stock market update and interrupt the user at 4:30 to deliver the update. This feature may be granular and detailed in the amount, type, and timing of information. In an embodiment, the amount of information may be a bank account balance.

In general, a user may form a 'habit' sufficient for the communication engine to proactively communicate with the user if the user repeats an action a minimum of three times. In an embodiment, the communication engine may determine an action by a user is a 'habit' only if it is repeated three or more times within thirty days, or a different pre-determined amount of time. Limiting the time may increase performance and save on storage performance and costs. In other embodiments, the number of times to form a 'habit' may vary. In an embodiment, this feature may be toggled on and off by the user.

In an embodiment, the AI/ML communication engine may track and monitor the times and locations of the user's logins to the application. The communication engine may monitor these data points in order to determine the times, or periods of time, the user is most likely to login, as well as the typical locations from which the user logs in. Once a baseline is established by the communication engine, any deviation from times and locations may be indicative of malicious activity. In an embodiment, the AI/ML communication engine may generate an alert when the user fails to login to the application during the typical times (and from the typical location(s)) the user usually logs in at and from. In an embodiment, the alert may be generated after two or more consecutive failures to login. In an embodiment, an alert may be generated if the user logs in from a non-typical location and/or at a non-typical time.

In an embodiment, if or when the AI/ML communication engine detects malicious or fraudulent activity, it may request authentication from the user before allowing the interaction to continue. In an embodiment, the authentication requested may be biometric authentication.

A method for proactively and preemptively communicating with a user interacting with a software application is provided. The method may utilize artificial intelligence/machine learning ("AI/ML"). The method may include an AI/ML, communication engine running on a central server. In an embodiment, the server may be distributed. The method may include the communication engine monitoring and tracking, at the server, the user's interaction(s) with the application. The method may include the communication engine determining when the interaction is fraudulent and/or when the user needs more training on using the application.

The method may include the communication engine revoking or restricting access to the application by the user when the communication engine detects malicious activity. The method may also include the communication engine creating and sending a report for every detected malicious activity. In an embodiment, the method may include the communication engine sending the report of malicious or suspicious activity to an administrator of the application.

The method may include the communication engine suggesting and displaying training materials for the user to complete when the communication engine detects that the user needs help with using the application.

The method may include the communication engine being trained by information including past interactions of the user with the application, past interactions by other users with the application, time limits, and other training data. In an embodiment, the time limits may be determined by the communication engine averaging the length of time for all previous users performing that action. This may provide the communication engine with an average length of time for an average user of the application. In an embodiment, this average length of time may be constantly updated by the communication engine as it receives more data points. In an embodiment, the communication engine is provided with an initial average length of time.

In an embodiment, the method may include the communication engine communicating information to the user before the user actually requests that information. In an embodiment, the information may be sent as a hyperlink the user may have to select. This may protect the information from malicious actors.

In an embodiment, the method may include the communication engine monitoring and tracking the time(s) the user typically logs in and the locations from where the user typically logs in. Tracking this information may help the communication engine detect and prevent malicious activity.

A method for proactively delivering information to a user while the user is using a software application is provided. The method may utilize artificial intelligence/machine learning ("AI/ML"). The method may include an AI/ML communication engine running on a central server. In an embodiment, the server may be distributed. The method may include the communication engine monitoring and tracking, at the server, the user's use of the application. The method may include the communication engine monitoring and tracking all of the user's interactions with the application.

The method may include the communication engine predicting, through an AI/ML algorithm or algorithms, two or more pieces of information the user may request. In an embodiment, the communication may predict that the user will not request any information, or only one quantum of information.

The method may include the communication engine communicating with the application and transmitting the predicted information or the predicted requests to the application. The method may include the communication engine creating a clickable link (or hyperlink) to an answer for each predicted request for information, and displaying each link on a graphical/visual display created by the application. For example, the communication engine may predict that the user will request account balances for each of two or more accounts (e.g., a checking and a savings account) at 9 a.m. The communication engine may retrieve that information, create a link to the information and send it to the application the user utilizes to check account information, before 9 a.m. so that the information is ready and to increase responsiveness of the application.

The method may include the communication engine being trained by information including past interactions of the user with the application, past interactions by other users with the application, time limits, and other training data. In an embodiment, the time limits may be determined by the communication engine averaging the length of time for all previous users performing that action. This may provide the communication engine with an average length of time for an average user of the application. In an embodiment, this average length of time may be constantly updated by the communication engine as it receives more data points. In an embodiment, the communication engine is provided with an initial average length of time.

In an embodiment, the communication engine may create a dynamic link. For example, the bank account information may change between the time the link is created and the predicted time of the request. Instead of the link displaying an incorrect amount, the link may display a dynamic amount that is reflective of the account balance at the time the link is selected, not the time the link is created. Alternatively, in an embodiment, each link may be static. In this embodiment, the link may lead to a display that says "this information was accurate as of (the time the link was created)."

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
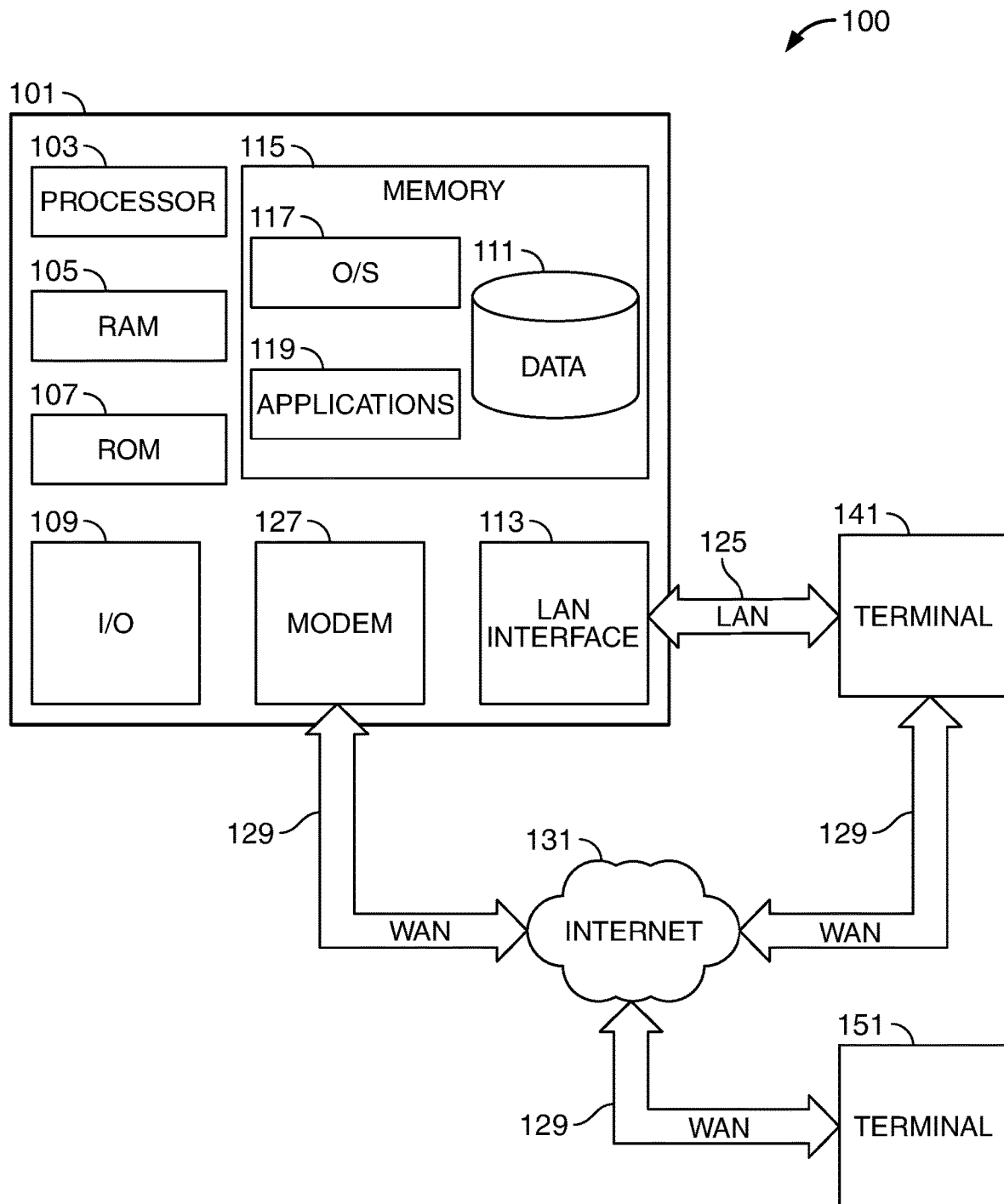
FIG. 1 shows an illustrative apparatus in accordance with principles of the disclosure.

It is an object of this disclosure to provide apparatus and methods for proactive communication with a user interacting with a software application.

An apparatus for pre-empting a user's interactions with a software application is provided. The apparatus may utilize artificial intelligence/machine learning ("AI/ML") algorithms to determine if a user's interaction with an application is fraudulent or if a user requires help and training while using the application.

In an embodiment, the apparatus may be incorporated into the software application as a separate module. Alternatively, the apparatus may act as a third-party application watching over or injecting itself into existing software applications. In an embodiment, the AI/ML communication engine may be a part of (i.e., a module or plugin) the application the user is interacting with. In another embodiment, the AI/ML communication engine may be separate and distinct from the application the user is interacting with, e.g., the communication engine may be a third-party application.

For example, a company may utilize an existing software application as a chatbot to communicate with its customers. In an embodiment, the apparatus may be directly incorporated into the existing software application. In another embodiment, the apparatus may link to the existing application and retrieve any data between the application and customer for analysis and then communicate the results of the analysis back to the application in near real-time.

Any appropriate AI/ML algorithm or algorithms may be used, and one or another algorithm may be appropriate in different scenarios. The apparatus may be pre-trained before its first operational use or it may be trained as its use increases.

The apparatus may include a server. The server may be centralized or distributed across multiple computers. Centralized servers may increase reparability and decrease cost. In other embodiments, distributed servers may decrease costs and increase security and uptime.

The server may include a communication link. The server may utilize the communication link to communicate, over a network, with the application the user is interacting with. Any appropriate communication link may be used. The communication link may include any necessary hardware (e.g., antennae) and software to control the link. In an embodiment, the network may be the Internet. In another embodiment, the network may be an internal intranet. For example, if a company uses particular internal software applications, the apparatus may monitor an employee's usage of the software to detect where and when the employee requires further training.

The server may include one or more processors and non-transitory memory. The processors may be microprocessors. More processing power and memory may increase the functionality of the apparatus by allowing for more robust analysis and computation, and increasing the amount of data storage for the AI/ML algorithm(s) to utilize for training and analysis. The non-transitory memory may store an operating system as well as an AI/ML communication engine. The non-transitory memory may also store other applications as well as data, as necessary. The applications, including the operating system and the AI/ML communication engine may run on the processor(s).

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

The processor(s) may control the operation of the apparatus and its components, which may include RAM, ROM, an input/output module, and other memory. The microprocessor may also execute all software running on the apparatus—e.g., the operating system and any applications such as the AI/ML communication engine and any security protocols. Other components commonly used for computers, such as EEPROM or Flash memory or any other suitable components, may also be part of the apparatus.

The network connections/communication link may include a local area network (LAN) and a wide area network (WAN or the Internet), and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, WI-Fi, cellular networks, or other suitable frequencies.

Any memory may be comprised of any suitable permanent storage technology e.g., a hard drive or other non-transitory memory. The memory may store software including an operating system and any application(s) (such as the AI/ML communication engine) along with any data needed for the operation of the apparatus and to allow pre-emptive communication with a user. The data may also be stored in cache memory, or any other suitable memory. Alternatively, some or all of computer executable instructions (alternatively referred to as "code") may be embodied in hardware or firmware.

An input/output ("I/O") module may include connectivity to a keyboard, monitor, or network interface through which a user may provide input. The input may include input relating to cursor movement. The input/output module may also include one or more speakers for providing audio output and a video display device, such as an LED screen and/or touchscreen, for providing textual, audio, audiovisual, and/or graphical output.

The AI/ML communication engine may monitor and track what the user is doing with the software application, i.e., the user's interactions with the application. It may monitor and track the user's inputs, including queries and other interactions with the application. It may monitor and track the results of the user's inputs, i.e., any responses by the software application. By monitoring and tracking the user's inputs and communications with the application, the AI/ML communication engine may decide if the user's interaction(s) is fraudulent. The AI/ML communication engine may also decide if the user needs help or training on how to properly and quickly use the application.

For example, one factor the communication engine may analyze is the time taken by a user to perform a function: if a user is taking 100 seconds to perform a function that an average user takes 10 seconds to perform, it may be one factor showing that the user requires further training. In another example, what a user says to or asks of a chatbot or help query may be a factor showing that the user requires further training. In another example, the number of actions a user utilizes to perform an action may be another factor to analyze if the user needs more training. For example, if a user uses 100 inputs to perform a specific function, but could do it with 20 inputs, the communication engine may decide that further training would be useful. Other factors may be analyzed by the communication engine as necessary.

When the communication engine determines the interaction(s) is fraudulent it may revoke access to the application. In addition, it may generate an incident report regarding the fraudulent use of the application. In an embodiment, the communication engine may decide an interaction is fraudulent if its analysis comes to a conclusion of 'more likely than not' (i.e., 50.1%). In other embodiments, the threshold level may be higher. A higher threshold may reduce the number of false positives, but may also allow for more malicious activity to slip through. In an embodiment, the threshold level may be adjusted automatically by the communication engine using any appropriate algorithm and various factors. In another embodiment, the threshold level may be adjusted manually.

When the communication engine determines that the user requires further help or training with using the application, it may suggest and show one or more training modules for the user to complete. In an embodiment, the communication engine may decide a user requires further training if its analysis comes to a conclusion of 'more likely than not' (i.e., 50.1%). In other embodiments, the threshold level may be higher. A higher threshold may reduce the number of false positives, but may also allow for more inefficient activity to slip through. In an embodiment, the threshold level may be adjusted automatically by the communication engine using any appropriate algorithm and various factors. In another embodiment, the threshold level may be adjusted manually.

The AI/ML communication engine may utilize any appropriate machine learning algorithm or algorithms. The communication engine may analyze any number of factors, such as times, locations, number and types of actions, and others. The more factors (i.e., data points) analyzed, the more accurate the analysis may be. However, analyzing more factors may be more computationally expensive as well as data-storage intensive.

The communication engine may learn from the user's past interactions with the application. For example, if a user always uses the same (inefficient) inputs to perform a function, or a user starts using different or more involved inputs, it may indicate a need for further training. In another example, if the user always requests an account balance statement at 9:00 am on Mondays, the engine may be proactive and pre-empt the user's request and provide that information before the request. In an embodiment, these past interactions may be stored in a database. The database may be within the server or remote from the server. Some or all of the data may be encrypted.

The communication engine may learn from historical interactions of other users with the application. Learning from other users may provide a broader base of data for the AI/ML engine to refine its operations, as well as provide better results. For example, the data from other users may indicate that a function should take 10 seconds, or can be done using 15 inputs. If a user takes 60 seconds or 100 inputs to do the same function, it may indicate a need for further training. The engine may learn from various training data. The training data may be real-world data or engineered data.

In an embodiment, the AI/ML, communication engine may utilize pre-determined time limits when analyzing the user's interaction(s). For example, if a particular action should be performed by a user within an average of 10 seconds, a pre-determined time limit for that action might be 10 seconds, or 20 seconds, or some other pre-determined time. If the communication engine detects that the user has exceeded the pre-determined time, it may analyze and determine that the user requires further training on that particular action.

If the communication engine analyzes and determines that a user requires further training, the communication engine may suggest and display a training module or training materials for the user. In an embodiment, the communication engine may create a bespoke training module for the user and what the user is attempting to accomplish.

In an embodiment, the communication engine may point the user to training materials by providing a selectable link, e.g., a hyperlink, to an internal or external website containing the appropriate training materials. In another embodiment, the link may download the training materials. In another embodiment, the link may open a training module. In another embodiment, the link may stream the training materials. Any appropriate file type may be used.

In an embodiment, the pre-determined time limits may be determined by averaging the length of time for all previous users performing that action. This may provide the communication engine with an average length of time for an average user of the application. In an embodiment, this average length of time may be constantly updated by the communication engine as it receives more data points. In an embodiment, the communication engine is provided with an initial average length of time.

In an embodiment the training module or training materials suggested and/or displayed by the communication engine may be dynamic. For example, the training module or training materials may change, and may be changed (or created) by the communication engine. These training materials and modules may be unique, in some or many respects, to a particular user.

In an embodiment, the training materials may be bespoke to the user and created by the communication engine. In an embodiment, the training materials may be based on past trainings completed by the user, what the user is trying to accomplish, and/or user preferences. (For example, if the user prefers video trainings instead of power point slides, or vise-versa.) Training materials/modules may be interactive and responsive to the user as the user works her way through the training materials/modules.

In an embodiment, the communication engine may constantly update and revise the training materials as the user is viewing or completing them. For example, if the training materials are videos the user fast forwards through, the communication engine may switch to power point slides or other written materials. In an embodiment, the user may be unable to skip or fast forward through the training materials. In an embodiment, the training materials may include a quiz or other assessment of the user. The data from the assessment may be used to refine the communication engine, the training materials, or provide the user with feedback.

In an embodiment, the communication engine may create the training module/materials using an AI/ML algorithm or algorithms from existing examples by splicing different parts of the existing examples together. Existing examples may be unable to cover every situation; therefore, bespoke training materials may be useful for situations that were not included in the existing examples.

In an embodiment, the training materials/modules may be pre-set and unable to be changed by the communication engine. This may save computing resources as well as enable control over training materials to be maintained by the apparatus owner.

In an embodiment, the AI/ML communication engine may proactively and preemptively deliver information/data to the user, in addition to detecting malicious activity and detecting when training is required. The communication engine may preempt the user's request by studying the user's 'habits' and learning from prior requests. For example, if a user generally requests an update on the stock market for an application/chatbot at 5:00 p.m., the communication engine may prepare a stock market update and interrupt the user at 5:00 p.m. to deliver the update. This feature may be granular and detailed in the amount, type, and timing of information. In an embodiment, the amount of information may be a bank account balance.

In general, a user may form a 'habit' sufficient for the communication engine to proactively communicate with the user if the user repeats an action a minimum of three times. In an embodiment, the communication engine may determine an action by a user is a 'habit' only if it is repeated three or more times within one week, or a different pre-determined amount of time. Limiting the time may increase performance and save on storage performance and costs. In other embodiments, the number of times to form a 'habit' may vary. In an embodiment, this feature may be toggled on and off by the user, application administrator, or apparatus owner.

In an embodiment, the AI/ML communication engine may track and monitor the times and locations of the user's logins to the application. Monitoring these data points may help the communication engine determine the times, or periods of time, the user is most likely to login, as well as the typical locations from which the user logs in. Once a baseline is established by the communication engine, any deviation from times and locations may be indicative of malicious activity.

In an embodiment, the baseline may be preset. For example, the user may be required to 'clock-in' at 9:00 a.m. every weekday morning by opening a specific application that may be monitored by the apparatus.

In an embodiment, the AI/ML communication engine may generate an alert when the user fails to login to the application during the typical times (and from the typical location(s)) the user usually logs in at and from. The alert may be sent to a system administrator or other supervisor. In an embodiment, the alert may only be stored for later analysis, but is not sent to a human in the loop.

In an embodiment, the alert may be generated after two or more consecutive failures to login. In an embodiment, to avoid this alert, the communication engine may be informed of a vacation, sick day, termination, or other valid reason for a failure to login in advance by the user or an administrator. In an embodiment, an alert may be generated if the user logs in from a non-typical location and/or at a non-typical time. The communication engine may determine a log in is suspicious to a degree of 'more likely than not' or some other threshold value. Tradeoffs on threshold values may be false positives vs. failures to detect.

In an embodiment, if or when the AI/ML communication engine detects malicious or fraudulent activity, it may request authentication from the user before allowing the interaction to continue. The type and other requirements of authentication may be preset or may depend on the application the user is attempting to use. In an embodiment, the authentication requested may be biometric authentication. In an embodiment, multiple requests for authentication may generate its own report. In an embodiment, each request for authentication may generate a report or alert, whether or not the user successfully authenticates.

A method for proactively and preemptively communicating with a user interacting with a software application is provided. The method may utilize artificial intelligence/machine learning ("AI/ML") algorithm(s). Any appropriate algorithm may be used, such as a decision tree or random forest algorithms. Some algorithms may be more accurate than others, some may be faster or slower than others, and some algorithms may be more resource intensive than others.

The method may include an AI/ML communication engine running on a central server. In an embodiment, the server may be distributed. Running the communication engine on a distributed server may increase processing speed and enable more accurate analysis of a user's interactions with a software application.

The method may include the communication engine monitoring and tracking, at the server, the user's interaction(s) with the application. The communication engine may be a part of the application, or it may be a separate module that has access to all inputs and outputs of the application, as well as the uses of the application. The communication engine may run in the background of a user's computer, and analyze multiple interactions with a single application or multiple applications.

The method may include the communication engine determining when the interaction is fraudulent and/or when the user needs more training on using the application. The communication engine may determine either or both of these situations by analyzing the inputs by the user to the application and the outputs to the user by the application through an AI/ML algorithm or algorithms. Inputs and outputs may be as simple as a chatbot communication, or it may be a more complex application. For example, if a company has its own development toolbox, the communication engine may monitor an employee's use of the toolbox to determine if the employee needs training on a particular feature, or if a malicious actor has gained unauthorized access to the toolbox.

One factor the communication engine may analyze with respect to malicious activity is typing speed and style of the user. Users often have their own typing speeds and styles, and a deviation from the norm for this user may be indicative of malicious activity.

The method may include the communication engine revoking or restricting access to the application by the user when the communication engine detects malicious activity. Alternatively, the communication engine may require the user authenticate to continue using the application. In an embodiment, the authentication requested may be biometric authentication.

The method may also include the communication engine creating and sending a report for every detected malicious activity. In an embodiment, the method may include the communication engine sending the report of malicious or suspicious activity to an administrator of the application. In an embodiment, the report(s) may be filed and recorded but not sent to any human in the loop.

The method may include the communication engine suggesting and displaying training materials for the user to complete when the communication engine detects that the user needs help with using the application. In an embodiment, the training materials may be dynamic. In an embodiment, the training materials may be static. In an embodiment, the communication engine may create training materials from scratch. In another embodiment, the communication engine may create training materials by combining parts or all of previously provided training materials. In an embodiment, the communication engine may use AI/ML algorithm(s) to create the training materials. By creating bespoke training materials, the communication engine may increase productivity of the user.

In an embodiment, the communication engine may display the training materials to the user through a selectable link. In an embodiment, the communication engine may automatically display the training materials (e.g., such as in a pop-up ad on a webpage). In an embodiment, the user must complete the training before continuing to interact with the application. In another embodiment, the user may be able to skip the training. Whether the user completes or skips the training (or starts but does not finish) may be used as data points by the communication engine when it determines whether the user needs training, or what training materials to provide or create.

The method may include the communication engine being trained by information including past interactions of the user with the application, past interactions by other users with the application, time limits, and other training data. These, and other factors, may help the communication engine analyze the user's interactions with the software application. Factors may be updated, added, or subtracted, as necessary to create better and more accurate predictions and communications.

In an embodiment, the time limits may be determined by the communication engine averaging the length of time for all previous users performing that action. This may provide the communication engine with an average length of time for an average user of the application. In an embodiment, this average length of time may be constantly updated by the communication engine as it receives more data points. In an embodiment, the communication engine is provided with an initial average length of time. In an embodiment, the initial average may be manually updated. In another embodiment, the initial average may be updated by the communication engine as it gathers data over time from the user and other users.

In an embodiment, the method may include the communication engine communicating information to the user before the user actually requests that information. In an embodiment, the information may be sent as a hyperlink the user may have to select. This may protect the information from malicious actors. In another embodiment, this information may appear as a popup on the user's screen before the user actually requests the information. For example, if a user always transfers $100 from one account to another at 10:00 a.m. on Tuesdays, the communication engine may display the option for the user to do so, before the user actually requests a transfer. The user may agree or cancel the transfer.

In an embodiment, the method may include the communication engine monitoring and tracking the time(s) the user typically logs in and the locations from where the user typically logs in. Tracking this information may help the communication engine detect and prevent malicious activity, as one factor for the communication engine to analyze.

A method for proactively delivering information to a user while the user is using a software application is provided. The method may utilize artificial intelligence/machine learning ("AI/ML") algorithm or algorithms. In an embodiment, the user may interact with multiple software applications.

The method may include an AI/ML communication engine running on a central server. In an embodiment, the server may be distributed. In another embodiment, the engine may switch from a central server to a distributed server as needed. For example, during times of increased use and activity, more resources than those provided by a single central server may be needed to accurately and quickly proactively communicate with the user.

The method may include the communication engine monitoring and tracking, at the server, the user's use of the application and interactions with the application. The method may include the communication engine monitoring and tracking some of or all of the user's interactions with the application. In an embodiment, the communication engine may 'check in' with the application every second, or fraction of a second. In another embodiment, the communication engine may continuously monitor the user's interactions.

The method may include the communication engine predicting, through an AI/ML algorithm or algorithms, two or more pieces of information the user may request. For example, the user may have a habit of checking the stock market at a certain time, or checking an account balance at a certain time. Another example may be the user checking emails or instant messages at particular times. In an embodiment, the communication may predict that the user will not request any information, or only one quantum of information at any particular point in time.

The method may include the communication engine communicating with the application and transmitting the predicted information and/or the predicted requests to the application. The method may include the communication engine creating a clickable link (or hyperlink) to an answer for each predicted request for information, and displaying each link on a graphical/visual display created by the application.

For example, the communication engine may predict that the user will request account balances for each of two or more accounts (e.g., a checking and a savings account) at 9 a.m. The communication engine may retrieve that information, create a link to the information and send it to the application the user utilizes to check account information, before 9 a.m. so that the information is ready and to increase responsiveness of the application.

In an embodiment, the communication engine may determine the actual information requested and send and display that information (e.g., the actual account balances). In another embodiment, the communication engine may only determine what the requests will be, and create a link to where that information can be accessed, without actually looking up and providing the predicted information itself.

The method may include the communication engine being trained by information including past interactions of the user with the application, past interactions by other users with the application, time limits, and other training data. Other factors may be used to train the communication engine as well.

In an embodiment, the time limits may be determined by the communication engine averaging the length of time for all previous users performing that action. This may provide the communication engine with an average length of time for an average user of the application. In an embodiment, this average length of time may be constantly updated by the communication engine as it receives more data points. In an embodiment, the communication engine is provided with an initial average length of time.

In an embodiment, the communication engine may create a dynamic link. For example, the bank account information may change between the time the link is created and the predicted time of the request. Instead of the link displaying an incorrect amount, the link may display a dynamic amount that is reflective of the account balance at the time the link is selected, not the time the link is created. Alternatively, in an embodiment, each link may be static. In this embodiment, the link may lead to a display that says "this information was accurate as of _____ (the time the link was created)."

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 shows an illustrative block diagram of apparatus 100 that includes a server 101. Server 101 may alternatively be referred to herein as a "computing device." Elements of apparatus 100, including server 101, may be used to implement various aspects of the apparatus and methods disclosed herein. A "user" of apparatus 100 or server 101 may include other computer systems or servers, or a human.

Server 101 may have a microprocessor 103 for controlling the operation of the device and its associated components, and may include RAM 105, ROM 107, input/output module 109, and a memory 115. The microprocessor 103 may also execute all software running on the server 101—e.g., the operating system 117 and applications 119 such as the communication engine and a security protocol. Other components commonly used for computers, such as EEPROM or Flash memory or any other suitable components, may also be part of the server 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as the communication engine) along with any other data 111 (e.g., historical interactions of a user with a software application) needed for the operation of the apparatus 100. Memory 115 may also store biometric attributes measured by biometric sensors. The biometric attributes may also be stored in cache memory, or any other suitable memory. Alternatively, some or all of computer executable instructions (alternatively referred to as "code") may be embodied in hardware or firmware (not shown). The microprocessor 103 may execute the instructions embodied by the software and code to perform various functions.

In an embodiment of the server 101, the microprocessor 103 may execute the instructions in all or some of the operating system 117, any applications 119 in the memory 115, any other code necessary to perform the functions in this disclosure, and any other code embodied in hardware or firmware (not shown).

An input/output ("I/O") module 109 may include connectivity to a keyboard, monitor, microphone or network interface through which higher hierarchal server or a user of server 101 may provide input. The input may include input relating to cursor movement. The input/output module 109 may also include one or more speakers for providing audio output and a video display device, such as an LED screen and/or touchscreen, for providing textual, audio, audiovisual, and/or graphical output (not shown).

Apparatus 100 may be connected to other systems, computers, servers, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or Wi-Fi).

Terminals 141 and 151 may be personal computers or servers that include many or all of the elements described above relative to apparatus 100. The network connections depicted in FIG. 1 include a local area network (LAN) 125 and a wide area network (WAN) 129 but may also include other networks. Server 101 may include a network interface controller (not shown), which may include a modem 127 and LAN interface or adapter 113, as well as other components and adapters (not shown). When used in a LAN networking environment, server 101 is connected to LAN 125 through a LAN interface or adapter 113. When used in a WAN networking environment, server 101 may include a modem 127 or other means for establishing communications over WAN 129, such as Internet 131. The modem 127 and/or LAN interface 113 may connect to a network via an antenna (not shown). The antenna may be configured to operate over Bluetooth, Wi-Fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for invoking user functionality related to performing various tasks. In an embodiment, application program(s) 119 may be cloud-based applications. In an embodiment, application program(s) 119 may be an AI/ML communication engine and/or a security protocol. The various tasks may be related to preemptively and proactively communicating with a user interacting with a software application, to detect fraud, determine if the user needs training, or provide the user with information before the user requests that information.

Server 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, or any other suitable device for receiving, storing, transmitting and/or displaying relevant information. Terminal 151 and/or terminal 141 may be other devices such as remote servers. The terminals 151 and/or 141 may be computers where the user is interacting with the application that is being monitored by apparatus 100.

Any information described above in connection with data 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
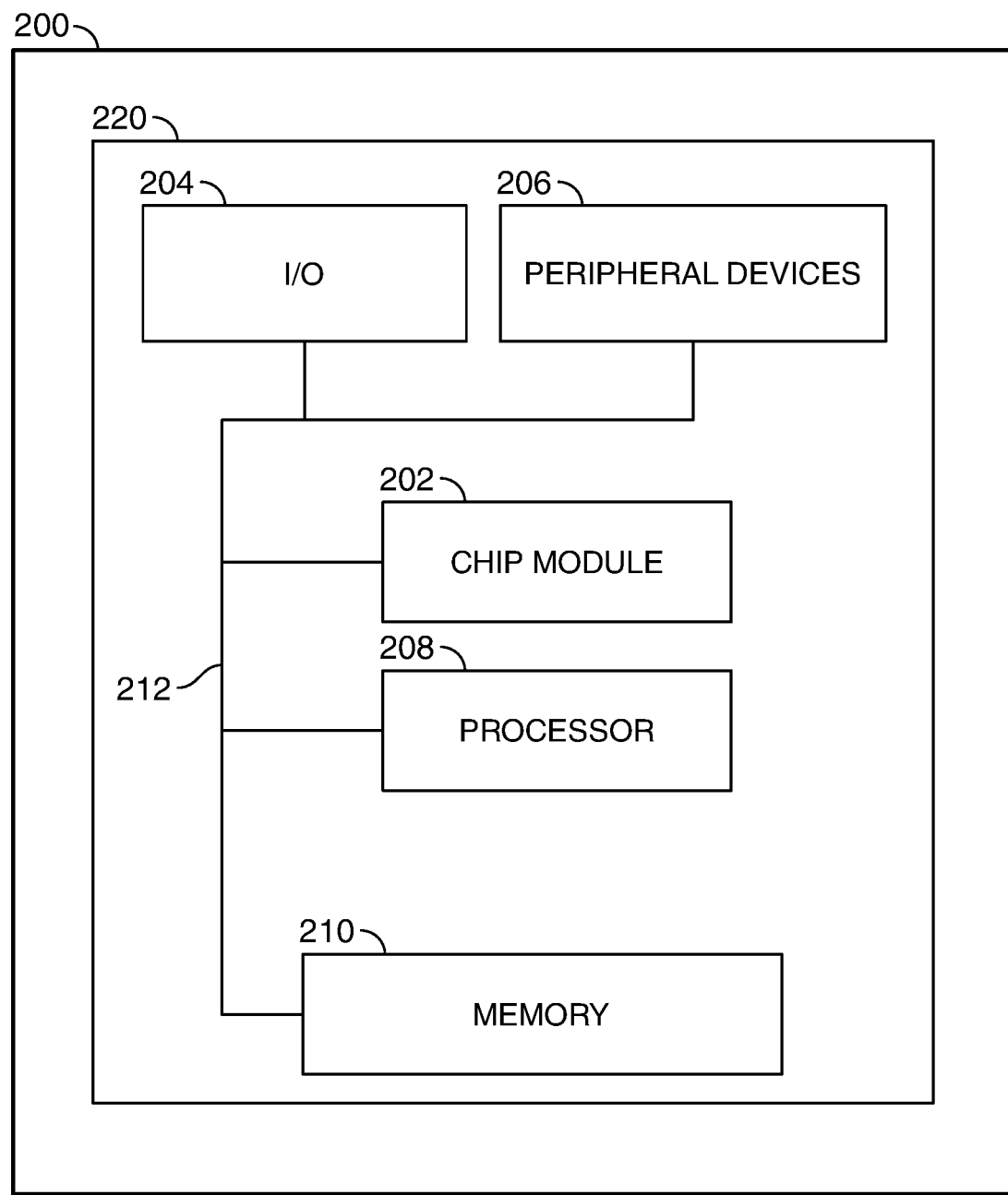
FIG. 2 shows an illustrative apparatus in accordance with principles of the disclosure.

FIG. 2 shows illustrative apparatus 200 that may be configured in accordance with the principles of the disclosure. Apparatus 200 may be a mobile device with various applications 206. Apparatus 200 may include one or more features of the apparatus shown in FIGS. 1 and 3. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an LED screen, a touchscreen or any other suitable media or devices; peripheral devices 206, which may include interactive devices; logical processing device 208, which may compute data information and structural parameters of various applications; and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
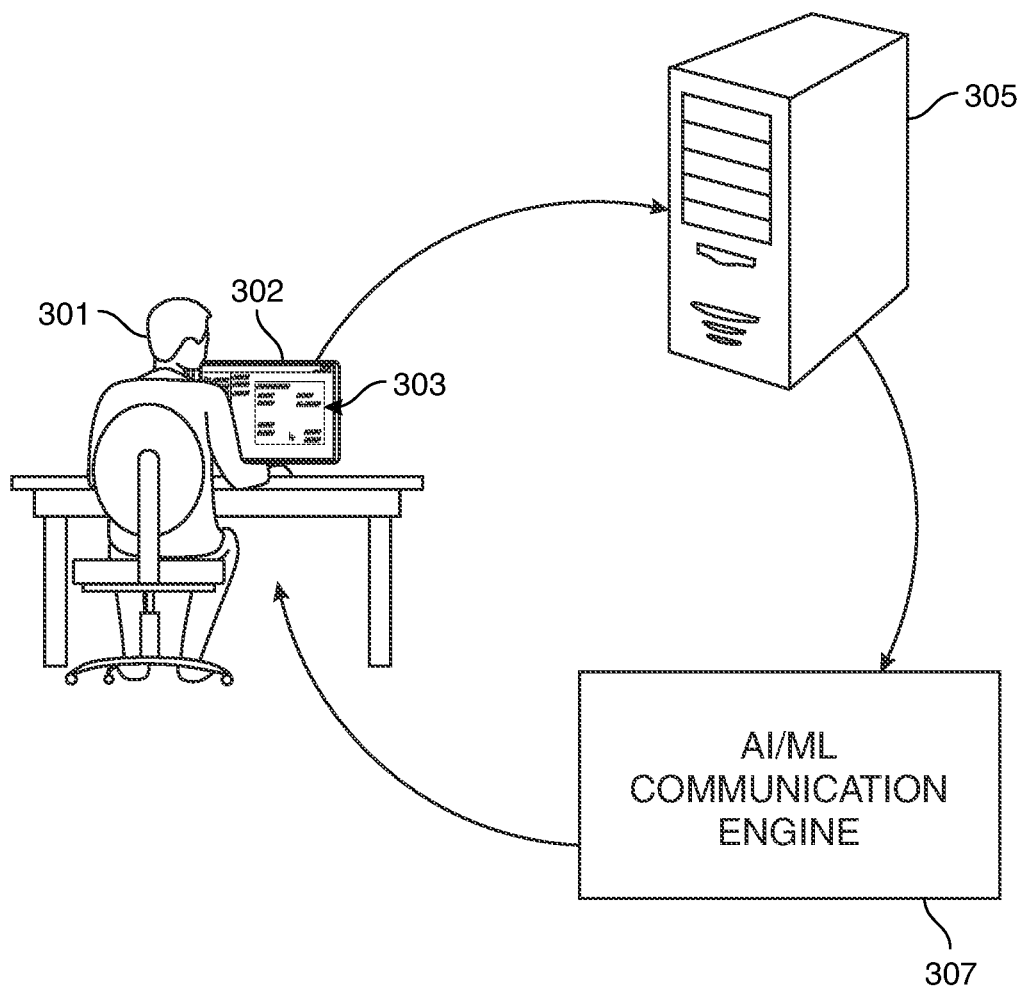
FIG. 3 shows an illustrative diagram in accordance with principles of the disclosure.

FIG. 3 shows an illustrative diagram in accordance with principles of the disclosure. A user 301 may interact with a software application 303 on a remote computer 302. The application 303 may communicate with remote server 305. Both the remote computer 302 and remote server 305 may include one or more processors (not shown), non-transitory memory (not shown) and other hardware.

An AI/ML communication engine 307 on remote server 305 may monitor and analyze the user's 301 interactions with the application 303. The communication engine 307 may communicate with the application 303 and proactively or preemptively communicate with the user.

Figure 4:
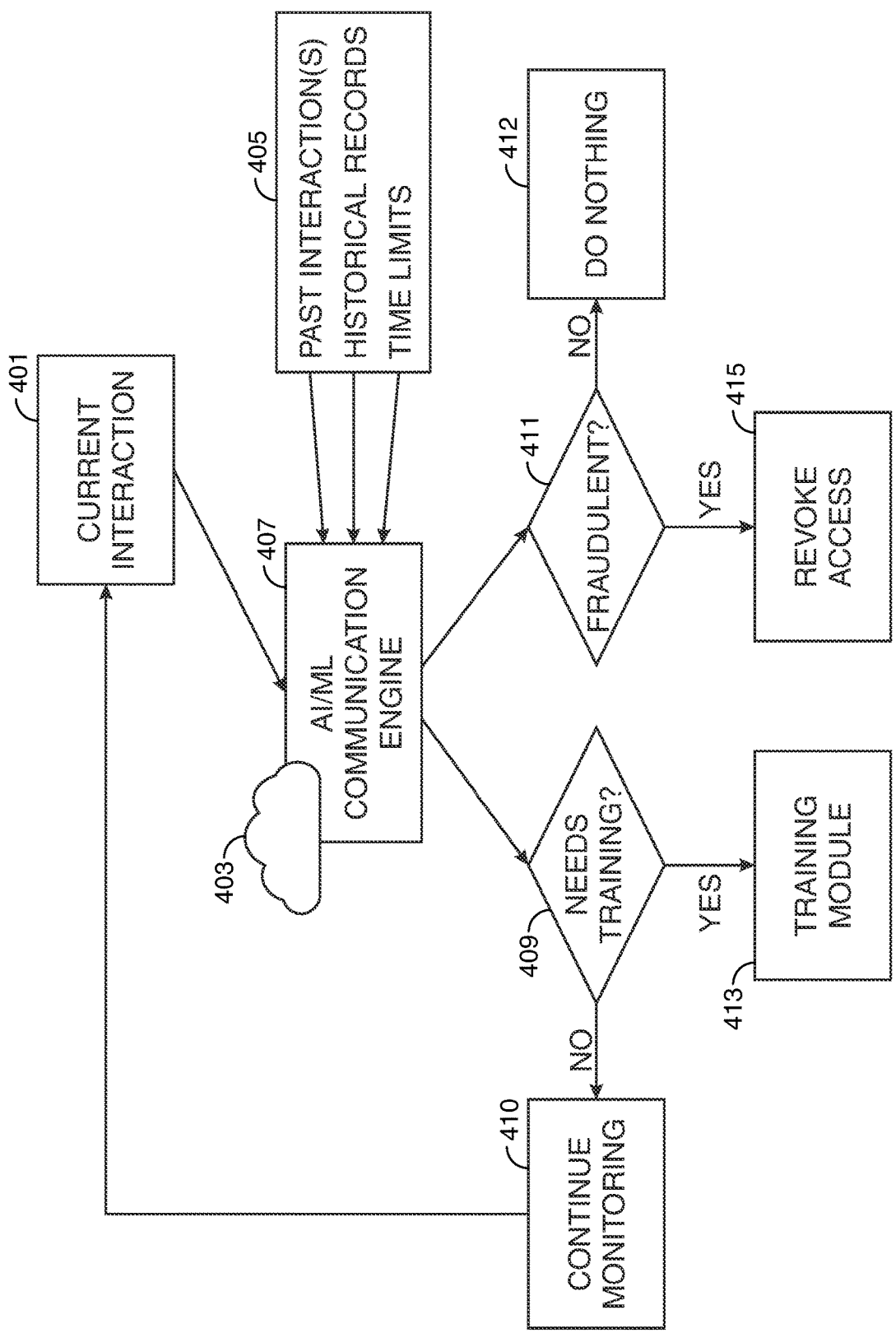
FIG. 4 shows an illustrative flowchart in accordance with principles of the disclosure.

FIG. 4 shows an illustrative diagram and flowchart in accordance with principles of the disclosure. Methods may include some or all of the method steps and apparatus numbered 401 through 415. Methods may include the steps illustrated in FIG. 4 in an order different from the illustrated order. The illustrative method shown in FIG. 4 may include one or more steps performed in other figures or described herein. Steps and apparatus 401 through 415 may be performed on the apparatus shown in FIGS. 1, 2 and 3, or other apparatus.

At step 401, a user's current interaction with an application may be sent to an AI/ML communication engine 407, which may be in the cloud 403. The communication engine 407 may leverage and use the data 405 to train the AI/ML algorithm. Data 405 may include past interactions of the user, historical records of other users, pre-determined time limits and other data.

At step 409, the communication engine 407 may determine through its analysis of current interaction 401 if the user needs further training in using the application. If yes, at step 413 the communication engine may provide training materials to the user. In an embodiment, the communication engine 407 may create the training module/materials and tailor the materials to the user.

If the user does not need further training, at step 410, the communication engine 407 may continue to monitor the user's interactions to determine if the user will need further training at a different point in time.

At step 411, the communication engine 407 may determine if the user's current interaction 401 with the application is fraudulent or not. If yes, the communication engine 407 may revoke access at step 415. Alternatively, the communication engine 407 may request the user authenticate herself, or re-authenticate herself. In an embodiment, biometric authorizations and authentication(s) may be required.

If the communication engine 407 determines that the user's interaction 401 is not fraudulent, the engine 407 may do nothing at step 412. Alternatively, the communication engine 407 may continuously monitor the user's interactions with the application to determine if later interactions are fraudulent or not.

Figure 5:
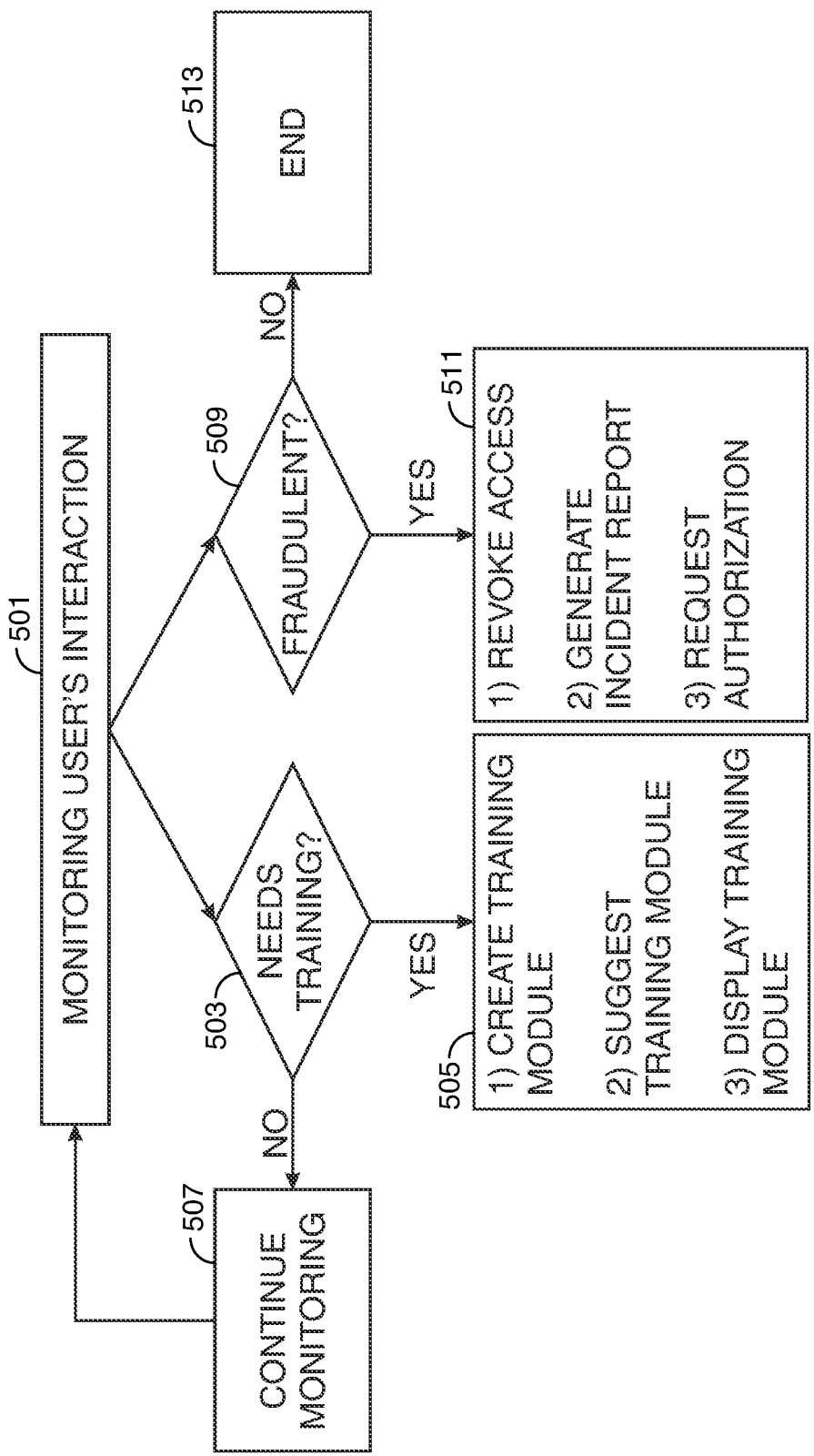
FIG. 5 shows an illustrative flowchart in accordance with principles of the disclosure.

FIG. 5 shows an illustrative flowchart in accordance with principles of the disclosure. Methods may include some or all of the method steps numbered 501 through 513. Methods may include the steps illustrated in FIG. 5 in an order different from the illustrated order. The illustrative method shown in FIG. 5 may include one or more steps performed in other figures or described herein. Steps 501 through 513 may be performed on the apparatus shown in FIGS. 1, 2, and 3, or other apparatus.

At step 501, an AI/ML communication engine may monitor a user's interaction with a software application. At step 503, the communication engine may analyze the interaction to determine if the user requires more training in interacting with the application. If yes, at step 505, the communication engine may create a training module/training materials, suggest the user complete the training materials, and display the training module/materials to the user. The training materials may be displayed directly or they may be behind a link the user has to select. If the communication engine determines that the user does not need further training, at step 507 it will continue monitoring the user's interactions to determine if training will be required at a future interaction. And then the process may be iterated/repeated at step 501.

At step 509, the communication engine may analyze the user's interactions from step 501 and determine if the interaction is fraudulent or not. If the interaction is determined to be fraudulent, at step 511, the communication engine may revoke access, generate an incident report, and/or request further authentication from the user. In an embodiment, the incident report may be sent to a system administrator or other human in the loop. If the communication engine does not detect any fraud, it may end the analysis at step 513 and allow the user to continue to interact with the application. In an embodiment, the communication engine may continue to monitor the user's interactions to determine if the interactions become fraudulent at a future time.

Figure 6:
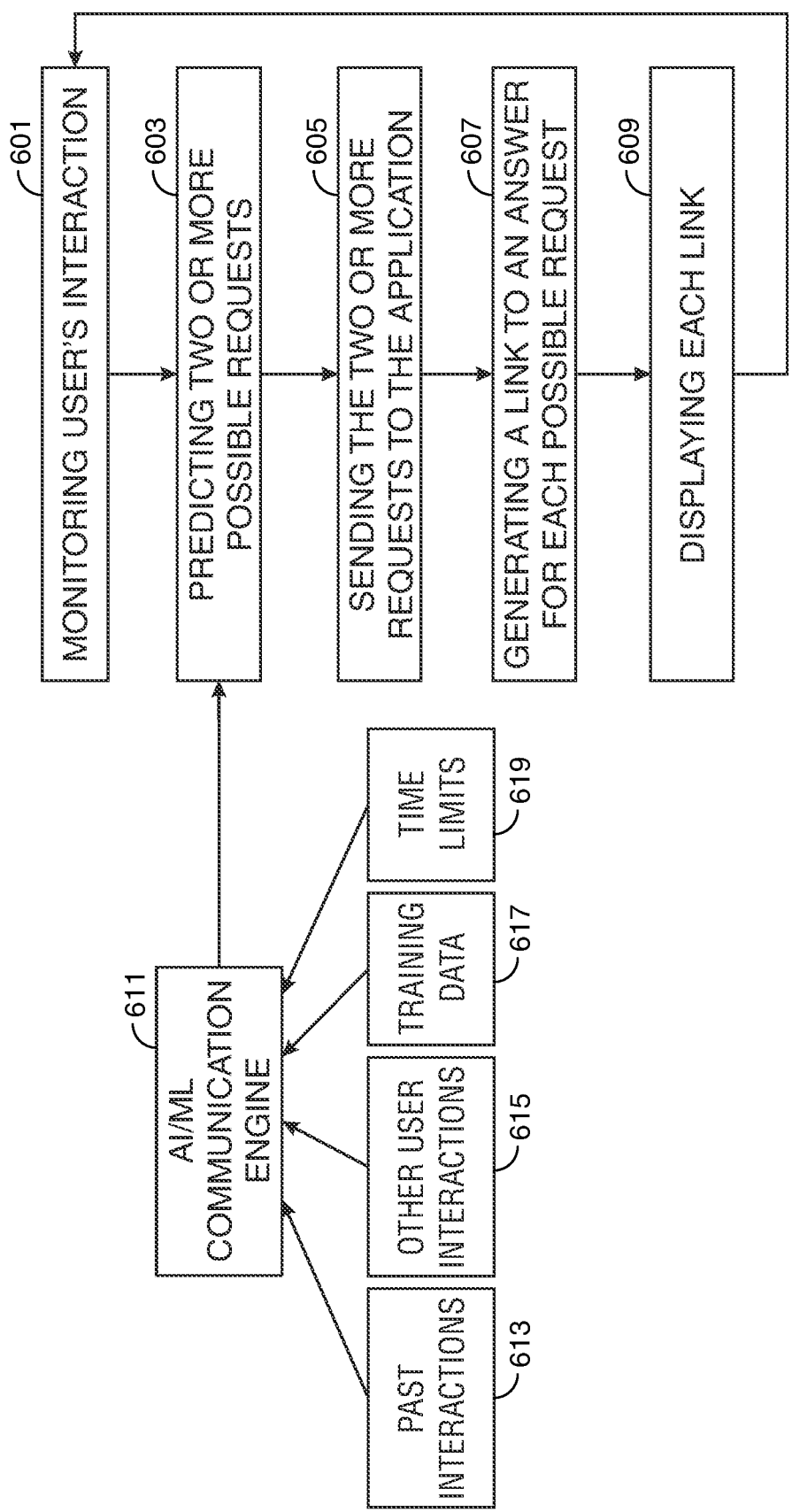
FIG. 6 shows an illustrative flowchart in accordance with principles of the disclosure.

FIG. 6 shows an illustrative flowchart in accordance with principles of the disclosure. Methods may include some or all of the method steps numbered 601 through 609, using apparatus 611 through 619. Methods may include the steps illustrated in FIG. 6 in an order different from the illustrated order. The illustrative method shown in FIG. 6 may include one or more steps performed in other figures or described herein. Steps 601 through 609 may be performed on the apparatus shown in FIGS. 1, 2, and 3, shown in elements 611-619, or other apparatus.

At step 601, an AI/ML communication engine may monitor a user's interaction with a software application. At step 603, the communication engine may analyze the interaction to predict two or more possible requests for information the user may make. If the engine only determines that the user will make zero or one request, it may continue to monitor the interaction(s).

At step 605, the communication engine may send the two or more predicted requests (or information about the requests) to the application the user is interacting with. At step 607, the communication engine may generate a link to an answer for each predicted request for information. For example, the communication engine may determine that a user will request a bank account balance and a stock market update at certain times. It may then generate a link to an answer for each request. The link may contain the answer or it may be only a link to where the answer can be found (e.g., the account website, or a stock market watch website).

At step 609, each link may be displayed to the user, so that the user can choose to retrieve the information or not. In an embodiment, the actual answer may be displayed for the user, as in a popup. For example, if the communication engine determines that a user will request a bank account balance update at 9 a.m., a popup with the balance may appear at 9 a.m., before the user actually requests the update. This process may be iterated/repeated as long as the user's interactions with the application are being monitored.

The process may utilize an AI/ML communications engine 611. The communication engine 611 may use data from: the user's past interactions 613, other users' interactions 615, training data 617, pre-determined time limits 619, as well as other factors in its analysis of the user's interactions.

Figure 7A:
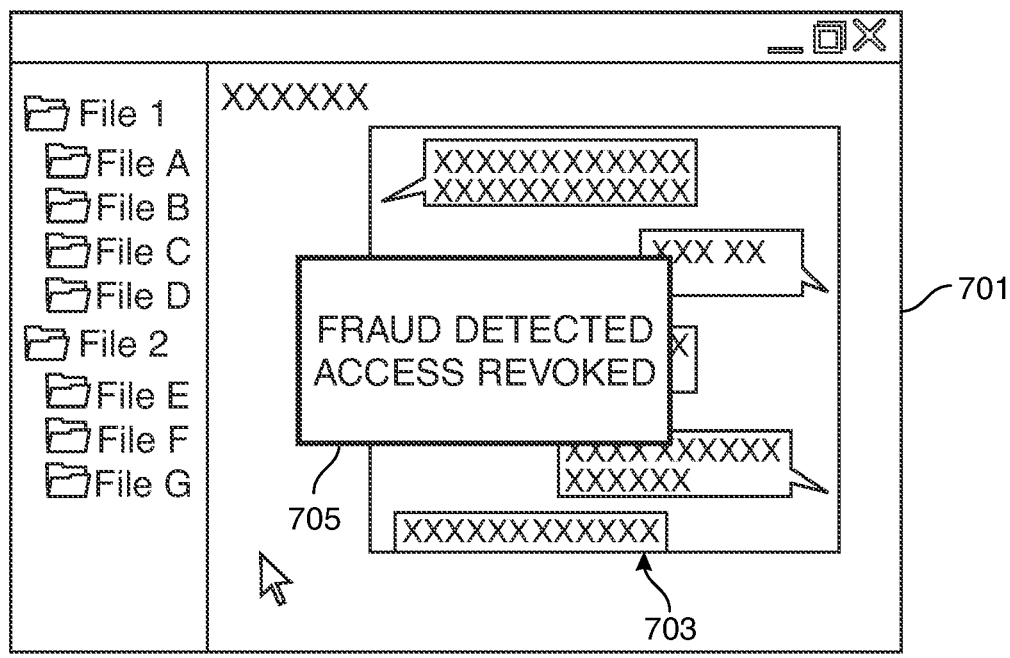
FIG. 7a shows an illustrative embodiment in accordance with principles of the disclosure.
Figure 7B:
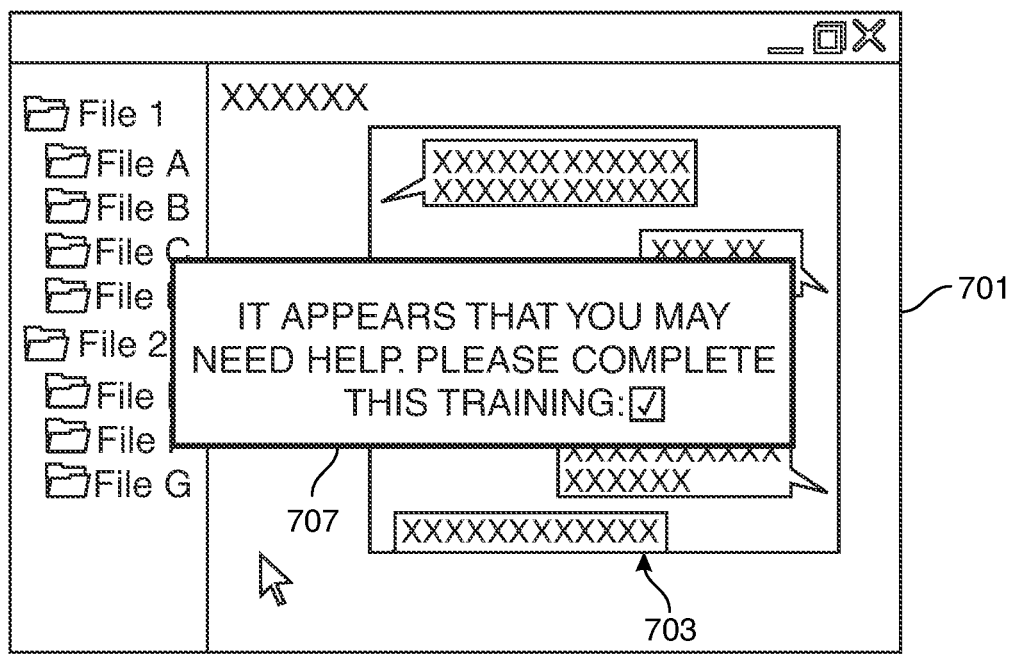
FIG. 7b shows an illustrative embodiment in accordance with principles of the disclosure.
Figure 7C:
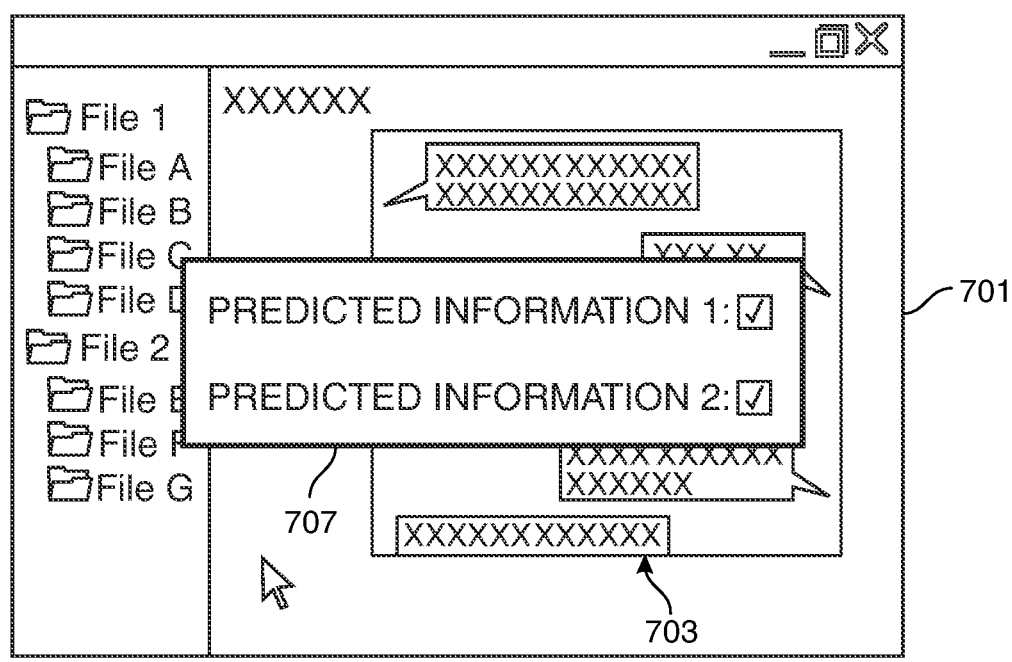
FIG. 7c shows an illustrative embodiment in accordance with principles of the disclosure.

FIGS. 7a, 7b, and 7c show illustrative embodiments of results of the previously described methods and apparatus. Screens 705, 707, and 709 may be the results of the methods described in FIGS. 4-6 that are performed on the apparatus shown in FIGS. 1, 2, and 3.

Application screen 701 is the application the user may be interacting with. Interactive box 703 may be a particular part of the application that the user may interact with, such as typing commands, or a chatbox.

In FIG. 7a, popup 705 displays a "fraud detected, access revoked" message to the user. In an embodiment, the popup may invite the user to authenticate or re-authenticate. The authentication requested may be biometric.

In FIG. 7b, the popup displays a message inviting the user to complete further training, as the communication engine has determined that the user needs further help and training. The popup may include a clickable link to the appropriate training materials. In an embodiment, the popup may include the training materials themselves (e.g., a video that autoplays or requires the user to press play).

In FIG. 7c, the popup may display two sets of information the communication engine has predicted the user will request, along with a link to the information itself. In an embodiment, the popup may display the information without going through a link.

Thus, apparatus and methods to proactively and preemptively communicate with a user interacting with a software application are provided. Persons skilled in the art will appreciate that the present invention can be practiced by other than the described embodiments, which are presented for purposes of illustration rather than of limitation.

What is claimed is:

1. An apparatus for proactively, through one or more artificial intelligence/machine learning ("AI/ML") algorithms, communicating with a user interacting with a software application, the apparatus comprising:
    a central server, the central server comprising:
        a communication link;
        a processor;
        a non-transitory memory configured to store at least:
            an operating system; and
            an AI/ML communication engine that runs on the processor and is configured to:
                monitor the user's interaction with the application;
                determine when the interaction is fraudulent;
                proactively deliver a quantum of information to the user prior to the user requesting the quantum of information by analyzing, at least, the user's past interactions with the application;
                determine when the user requires further training on how to interact with the application by analyzing, at least, a time for the user to complete an action compared to an average time for all previous users to complete the action;
                revoke access to the application and generate an incident report when the interaction is fraudulent; and
                when the user requires further training on how to interact with the application:
                    create a unique training module for the user; and
                    display the unique training module to the user; and
    wherein the AI/ML communication engine leverages at least one of the following to determine when the interaction is fraudulent and to determine when the user requires further training on how to interact with the application:
        past interactions of the user with the application;
        historical interactions of other users with the application;
        pre-determined time limits; and
        training data.

2. The apparatus of claim 1 wherein the pre-determined time limits are determined by an average length of time for an interaction by an average user of the application.

3. The apparatus of claim 1 wherein the training module is dynamic.

4. The apparatus of claim 1 wherein the training module is static.

5. The apparatus of claim 1 further comprising the AI/ML communication engine being configured to track times and locations of the user's logins to the application to determine a time window in which the user is most likely to login.

6. The apparatus of claim 5 further comprising the AI/ML communication engine being configured to generate an alert when the user fails to login to the application at the pre-determined time window in which the user is most likely to login.

7. The apparatus of claim 6 wherein the alert is generated after two or more failures to login.

8. The apparatus of claim 1 wherein the quantum of information is a bank account balance.

9. The apparatus of claim 1 further comprising the AI/ML communication engine being configured to request authentication from the user when the AI/ML communication engine determines the interaction is fraudulent.

10. The apparatus of claim 9 wherein the authentication is biometric.

11. The apparatus of claim 9 wherein the central server is distributed across a plurality of servers.

12. A method for proactively, through artificial intelligence/machine learning ("AI/ML"), communicating with a user interacting with an application, the method comprising:
    monitoring, at a central server, the user's interaction with the application;
    delivering a quantum of information to the user prior to the user requesting the quantum of information by analyzing, at least, the user's past interactions with the application;
    determining, at the central server, when the interaction is fraudulent;
    determining, at the central server, when the user requires further training on how to interact with the application by analyzing, at least, a time for the user to complete an action compared to an average time for all previous users to complete the action;
    revoking access to the application when the interaction is fraudulent;
    generating an incident report when the interaction is fraudulent; and
    suggesting creating and displaying a bespoke training module to the user when the user requires further training on how to interact with the application; and
    wherein the steps of monitoring, determining, delivering, determining, revoking, generating, suggesting creating, and displaying are performed by an AI/ML communication engine running on the central server; and
    wherein the AI/ML communication engine is trained by one or more of:
        past interactions of the user with the application;
        historical interactions of other users with the application;
        pre-determined time limits; and
        training data.

13. The method of claim 12 wherein the pre-determined time limits are determined by an average length of time for an interaction by an average user of the application.

14. The method of claim 12 further comprising tracking times and locations of the user's logins to the application.

15. The method of claim 12 further comprising sending the incident report to an administrator of the application.

16. An artificial intelligence/machine learning ("AI/ML") proactive communication computer program product comprising executable instructions stored on a non-transitory memory of a central server, the instructions when executed by a processor on the central server:

monitor a user's interaction with a software application;
deliver a quantum of information to the user prior to the user requesting the quantum of information by analyzing, at least, the user's past interactions with the application;
determine when the interaction is fraudulent;
determine when the user requires further training on how to interact with the application by analyzing, at least, a time for the user to complete an action compared to an average time for all previous users to complete the action;
revoke access to the application when the interaction is fraudulent;
generate an incident report when the interaction is fraudulent; and
create and display a dynamic training module to the user when the user requires further training on how to interact with the application; and
wherein the AI/ML proactive communication computer program product leverages at least one of the following to determine when the interaction is fraudulent and to determine when the user requires further training on how to interact with the application:
past interactions of the user with the application;
historical interactions of other users with the application;
pre-determined time limits; and
training data.

* * * * *